(12) United States Patent
Champion et al.

(10) Patent No.: US 7,790,331 B1
(45) Date of Patent: Sep. 7, 2010

(54) FUEL CELL WITH FILM HAVING NANOWIRES THEREIN

(75) Inventors: David Champion, Lebanon, OR (US);
Neal W. Meyer, Corvallis, OR (US);
Peter Mardilovich, Corvallis, OR (US);
Gregory S Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 10/699,456

(22) Filed: Oct. 31, 2003

(51) Int. Cl.
*H01M 4/04* (2006.01)
*B05D 5/12* (2006.01)
(52) U.S. Cl. .................. 429/523; 427/98.4
(58) Field of Classification Search .............. 429/27
See application file for complete search history.

(56) References Cited

U.S. PATENT DOCUMENTS

| 6,509,619 | B1 | 1/2003 | Kendall et al. | |
|---|---|---|---|---|
| 6,696,189 | B2 * | 2/2004 | Bostaph et al. | 429/22 |
| 6,770,353 | B1 * | 8/2004 | Mardilovich et al. | 428/209 |
| 6,849,911 | B2 * | 2/2005 | Monty et al. | 257/414 |
| 2002/0098406 | A1 * | 7/2002 | Huang et al. | 429/44 |
| 2002/0142202 | A1 * | 10/2002 | Li et al. | 429/27 |
| 2003/0027033 | A1 * | 2/2003 | Seabaugh et al. | 429/40 |
| 2003/0180472 | A1 * | 9/2003 | Zhou et al. | 427/430.1 |
| 2004/0197626 | A1 * | 10/2004 | Jeon et al. | 429/30 |
| 2005/0053826 | A1 * | 3/2005 | Wang et al. | 429/44 |

OTHER PUBLICATIONS

Godinho, Mario, et al., Influence of Microwave Heating on the Growth of Gadolinium-doped Cerium Oxide Nanorods, Crystal Growth and Design, vol. 8, No. 2, pp. 384-386.*

* cited by examiner

*Primary Examiner* — Patrick Ryan
*Assistant Examiner* — Karie O'Neill Apicella

(57) ABSTRACT

A fuel cell has a substrate with a film deposited thereon. The film has nanowires dispersed therein. Catalytic activity and conductivity is substantially enhanced throughout the film.

25 Claims, 2 Drawing Sheets

FUEL CELL WITH FILM HAVING NANOWIRES THEREIN

BACKGROUND OF THE INVENTION

The present invention relates generally to fuel cells, and more particularly to fuel cells with films having nanowires therein.

Fuel cells use an electrochemical energy conversion of fuel (including but not limited to hydrogen, propane, methane, carbon monoxide, and the like) and oxidant(s) into electricity and heat. It is anticipated that fuel cells may be able to replace primary and secondary batteries as a portable power supply. In fuel cells, the fuel (usually containing a source of hydrogen) is oxidized typically with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC)/voltage that may be used to power motors, lights, electrical appliances, etc. A solid oxide fuel cell (SOFC) is one type of fuel cell that may be useful in portable applications, as well as in many other applications.

Improved thermal characteristics and performance are generally at the forefront of new fuel cell designs. Performance at the anode and the cathode may generally be related to the number of catalytic sites available and the modification of the electronic properties.

In attempts to achieve greater activity and performance at the anode and cathode, porous films and mixed conducting films have been deposited as electrode films, and/or these films have been impregnated.

These films have been deposited by various methods. One such method is physical vapor deposition (PVD). However, maintaining stability of the films in the oxidizing/reducing environment is a challenge. Another method is the glancing angle deposition (GLAD) process. However, GLAD uses an expensive solution, and it is difficult to obtain multi-component metallic/oxide films. Porous films deposited by the above methods generally have a relatively limited number of catalytic sites per unit volume. Mixed conductors (eg. SSCO) also have a relatively limited number of catalytic sites per unit volume.

The impregnation of films with catalysts offers limited control of the shape and size of the particles that strongly affect catalytic activity. Thick film porous anode or cathode supported membranes may be prepared using a press and anneal process. However, this too relatively limits the number of catalytic sites per unit volume.

SUMMARY OF THE INVENTION

The present invention substantially solves the drawbacks enumerated above by providing a fuel cell having a substrate with a film deposited thereon. The film has nanowires dispersed therein. Catalytic activity and conductivity is substantially enhanced throughout the film.

BRIEF DESCRIPTION OF THE DRAWINGS

Objects, features and advantages of the present invention will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION OF THE EMBODIMENTS

As will be described further hereinbelow, in an embodiment of the fuel cell of the present invention, nanowires in a film allow for high surface area per unit mass, thus generally advantageously resulting in increased catalytic activity. In further embodiment(s) of the fuel cell of the present invention, the nanowires generally advantageously provide high electron conductivity and added material strength.

Further, an embodiment of the present invention provides a method for patterning nanowires without the need for an etching process.

Figure 1:
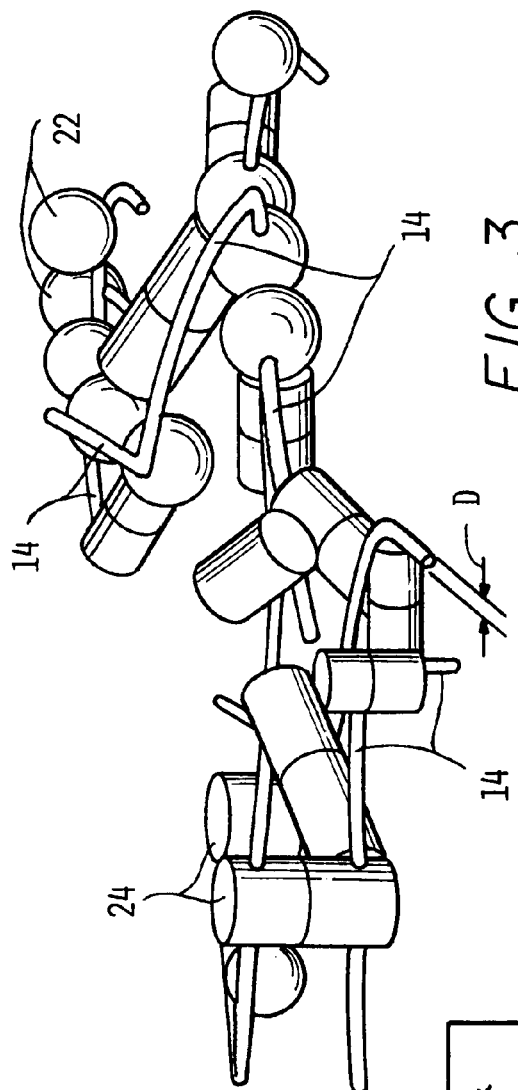
FIG. 1 is a schematic view of an embodiment of the present invention, showing a homogeneous suspension deposited on the substrate.

Referring now to FIG. 1, a method of making a film according to an embodiment of the present invention includes the step of dispersing a plurality of nanowires 14 in a liquid 16. This dispersion may form a homogeneous suspension 18. An embodiment of the method of the present invention provides an aqueous process to deposit nanowires 14.

It is to be understood that any suitable liquid 16 may be chosen. In an embodiment, the liquid 16 is an organometallic solution, a sacrificial polymeric solution (one non-limitative example of which is commercially available under the tradename Unity 4411S Sacrificial Polymer from Promerus LLC in Brecksville, Ohio), a photoresist, and/or a solvent (non-limitative examples of which include alcohols, acetone, water, and/or mixtures thereof).

It is to be understood that any suitable organometallic solution may be chosen. Some non-limitative examples of the organometallic solution may be metal-organometallic compounds suspended in solution, metal ions coordinated with organic ligands that are dissolved in solution, and/or the like. In an embodiment, the organometallic solution is a sol-gel that has been processed by hydrolysis or polymerization reactions to form a colloidal suspension. Further, some non-limitative examples of suitable organometallic solutions include, but are not limited to cerium 2-ethylhexanoate and gadolinium acetate in 2-ethyl-hexanoic acid and/or zirconium isopropoxide and yttrium isopropoxide in toluene. An organometallic solution may act as a binder between the electrode material (or more generally any media that is compatible with the nanowires 14 and solvent), the nanowires 14, and the substrate 12.

It is also to be understood that any suitable positive or negative photoresist may be chosen. In an embodiment of the present invention, the photoresist is tetra-ethylene glycol diacrylate, polyvinylphenol (PVP), poly(4-vinylphenol), poly (4-hydroxystyrene), and/or any DNQ (diazonaphthoquinone)-novolak based resist.

It is to be understood that in an embodiment of the present invention, the nanowires 14 may be dispersed directly into the photoresist.

In an alternate embodiment, the nanowires 14 are optionally dispersed into a suitable solvent, and then the solvent having the nanowires 14 therein is mixed into the photoresist. It is to be understood that any suitable solvent may be chosen that will dissolve in the photoresist. In a non-limitative embodiment, the solvent is acetone, water, and/or polyvinyl alcohol (PVA). If the nanowires 14 are mixed with PVA, the PVA with nanowires 14 therein may then be sonicated in water or alcohol prior to being mixed into the photoresist.

In an embodiment of the present invention, the nanowires 14 generally have a structure that is nanodimensional in two substantially orthogonal dimensions, and generally significantly elongated in the third. It is to be understood that nanowires 14 include, but are not limited to nanorods, nanowhiskers, nanotubes, and/or nanobelts.

The nanowires 14 are generally in the form of a solid material and may have a composition of a multi-component alloy or a coated core-shell system. Some examples of materials suitable for nanowires 14, including for the multi-component alloy/core shell systems, include, but are not limited to carbon, copper, nickel, platinum, gold, iron, and/or alloys thereof, stainless steel, lanthanum strontium chromite, and/or mixtures thereof. Some further examples of suitable nanowire 14 materials include but are not limited to nickel-gold alloys, copper-gold alloys, platinum on stainless steel, nickel on stainless steel, and/or mixtures thereof.

In a further embodiment of the present invention, the nanowires 14 are formed from current collector materials, electrode materials, catalyst materials, electrolyte filament materials, and/or mixtures thereof.

In an embodiment of the present invention, the current collector material includes high temperature metals. Non-limitative examples of high temperature metals which may be suitable for the current collector material include gold, copper, stainless steel, nickel alloys, and/or mixtures thereof. In an embodiment of the present invention, some high temperature nickel alloys are commercially available under the tradenames INCONEL 600 and INCONEL 601 from International Nickel Company in Wexford, Pa., and HASTELLOY X and HA-230 from Haynes International, Inc. in Kokomo, Ind.

Some non-limitative examples of electrolyte filament materials that may be selected for the nanowires 14 include yttria-stabilized zirconia (YSZ), aluminum oxide, and/or samarium doped ceria on stainless steel.

In an embodiment, the electrode material has components that are mixed electron ion conductors (MEIC). It is to be understood the mixed electron ion conductor may be chosen for either an anode or a cathode.

Figure 2:
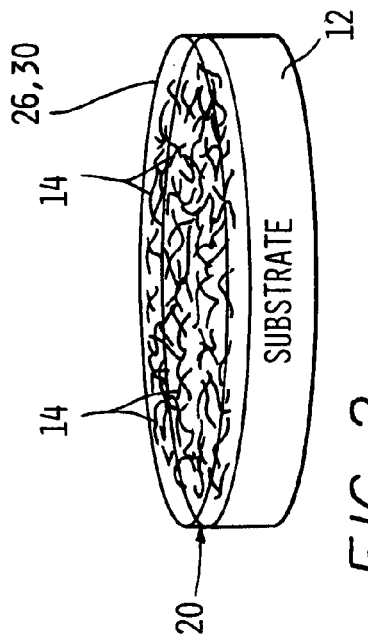
FIG. 2 is a perspective semi-schematic view of the embodiment of FIG. 1, showing a film on the substrate after the liquid is removed.

In a further embodiment of the present invention, the nanowires 14 form metallic components of an anode (designated as 26 in FIG. 2). Some non-limitative examples of such anode metallic components include nickel, copper, platinum, palladium, ruthenium, alloys thereof, and/or mixtures thereof.

In an alternate embodiment, the nanowires 14 form metallic components of a cathode (designated as 30 in FIG. 2). Some non-limitative examples of such cathode metallic components include rhodium, platinum, silver, alloys thereof, and/or mixtures thereof.

In an embodiment of the method of the present invention, the dispersing step includes adding the nanowires 14 to the liquid 16. The nanowire 14 and liquid 16 solution may be mixed thoroughly, for example by sonication. In an embodiment of the present invention, the dispersion may generally orient the nanowires 14 randomly throughout the liquid 16, resulting in the homogeneous suspension 18.

In an embodiment of the present invention, the highly anisotropic nature of the nanowires 14 throughout the homogeneous suspension 18 may be controlled. By controlling the anisotropic nature of the nanowires 14, the electronic states may be modified to further enhance the catalytic activity. In an embodiment of the present invention, the anisotropic nature of the nanowires 14 may be controlled by varying the nanowire 14 composition and/or diameter (designated as D in FIG. 3). A non-limitative example includes nanowires 14 that are nano-crystalline in nature. In an alternate embodiment, the anisotropic nature of the nanowires 14 may be controlled by coating the nanowire 14 with a capping layer. A non-limitative example of a capping layer is zinc sulfide.

An embodiment of the method of the present invention further includes the step of depositing the liquid 16 having the nanowires 14 therein (a non-limitative example of which is the homogeneous suspension 18) onto a substrate 12.

The substrate 12 may act as a support for the liquid 16 having the nanowires 14 therein (and ultimately the film 20). It is to be understood that any suitable substrate 12 may be used. In an embodiment, the substrate 12 is single crystal silicon, polycrystalline silicon, silicon oxide containing dielectric substrates, alumina, sapphire, ceramics, cermets, and/or mixtures thereof.

In an alternate embodiment, the substrate 12 may be one of an anode material, a cathode material, current collector material, and/or an electrolyte material. Some non-limitative examples of the anode material include nickel oxides, platinum oxides, Ni—YSZ (nickel-yttria stabilized zirconia), Cu—YSZ (copper-yttria stabilized zirconia), Ni—SDC (nickel-samaria doped ceria), Ni—GDC (nickel-gadolinium doped ceria), Cu—SDC (copper-samaria doped ceria), and Cu—GDC (copper-gadolinium doped ceria). Some non-limitative examples of the cathode material include but are not limited to silver oxides, platinum oxides, samarium strontium cobalt oxide (SSCO, $Sm_xSr_yCoO_{3-\delta}$), barium lanthanum cobalt oxide (BLCO, $Ba_xLa_yCoO_{3-\delta}$), gadolinium strontium cobalt oxide (GSCO, $Gd_xSr_yCoO_{3-\delta}$), lanthanum strontium manganite ($La_xSr_yMnO_{3-\delta}$) and lanthanum strontium cobalt ferrite ($La_wSr_xCO_yFe_zO_{3-\delta}$), and/or mixtures thereof.

In an alternate embodiment, the substrate 12 is an electrolyte 28. It is to be understood that any suitable electrolyte 28 may be used. Examples of a suitable electrolyte 28 include, but are not limited to, cubic fluorite structures, doped cubic fluorites, proton-exchange polymers, proton-exchange ceramics, yttria-stabilized zirconia, samarium doped-ceria, gadolinium doped-ceria, $La_aSr_bGa_cMg_dO_{3-\delta}$, and/or mixtures thereof.

In an embodiment, deposition of the liquid 16 having nanowires 14 therein is completed by any suitable electrodeposition process or coating technique. In an embodiment, electrophoretic deposition or electrolytic deposition is used. In an alternate embodiment, spin coating, dip coating, or squeegee coating is used to deposit the liquid 16 having nanowires 14 therein.

In an embodiment of the method of the present invention, the method may further include the step of imaging the liquid 16 having the nanowires 14 therein (for example, the homogeneous suspension 18). It is to be understood that any suitable photo-imaging process may be chosen. In an embodiment, the liquid 16 (a non-limitative example of which is a photoresist) having nanowires therein is selectively exposed during the imaging process such that generally any soluble matter is developed and washed away along with the nanowires 14 associated with that soluble material. Insoluble matter will remain for further processing, along with nanowires 14 associated with that insoluble matter, which processing will result in final deposition of nanowires 14 and associated materials without the photo-imaging solution (e.g. a photoresist). In an embodiment, imaging involves exposing the photoresist to a light source. The light source may be an ultraviolet (UV) light.

In an embodiment, imaging the homogeneous suspension 18 patterns the liquid 16 having nanowires 14 therein. It is to be understood that the homogeneous suspension 18 may be patterned into a predetermined configuration depending on the desired end use. By patterning the liquid 16 having nanowires 14 therein using an embodiment of method of the present invention, etching steps may not be required.

An embodiment of the method of the present invention further includes the step of heating. In an embodiment, the heating step includes first baking the substrate 12 with the liquid 16 having nanowires therein deposited thereon and second annealing. Baking substantially removes the solvents and annealing substantially drives off the organics and forms a predetermined crystal phase of the film 20.

In an embodiment, the bake temperature ranges between about 100° C. and about 450° C. In an alternate embodiment, the bake temperature is about 200° C.

In an embodiment, annealing is completed at a temperature ranging between about 450° C. and about 800° C. In an alternate embodiment, annealing occurs at a temperature ranging between about 650° C. and about 1050° C. Annealing may also result in the formation of alloy cross-sections between the nanowires 14. Cross-sectioning of the nanowires 14 generally forms more catalytic sites per unit volume in the film 20. As a result, higher conductivity may be achieved at a lower concentration of electrode material and/or current collector material.

Referring now to FIG. 2, an embodiment of FIG. 1 shows a film 20, with the nanowires 14 therein. It is to be understood that the film 20 may be an electrode (anode 26 or cathode 30). The electrode 26, 30 may be formed from any suitable anode 26 or cathode 30 material, including but not limited to examples of these materials herein. The film 20 remains on the substrate 12 after the liquid 16 is removed. The nanowires 14 increase (generally by depositing catalytic sites on electron conducting material) the number of sites per unit volume where catalysis may take place substantially throughout the film 20. Additionally, the nanowires 14 may advantageously assist in making the film 20 porous.

In a non-limiting embodiment of the present invention, film 20 is a cathode 30 having nanowires 14 therein formed from an electrolyte filament material. Nanoparticles (a non-limitative example of which are designated as 22 in FIG. 3) formed from a cathode material (one non-limitative example of which is samarium strontium cobalt oxide (SSCO)) are dispersed on and connected to the electrolyte filament material nanowires 14. The cathode nanoparticles provide increased surface area for catalysis to take place. Through the "spillover" phenomenon, an excess of the oxygen species transfers onto the surface of the electrolyte filament material nanowires 14, thereby increasing oxygen storage capability. In this embodiment, an electrolyte (designated as 28 in FIG. 4) is disposed on the film 20/cathode 30. The electrolyte may either be the substrate 12, or it may be disposed on the film 20/cathode 30.

Figure 3:
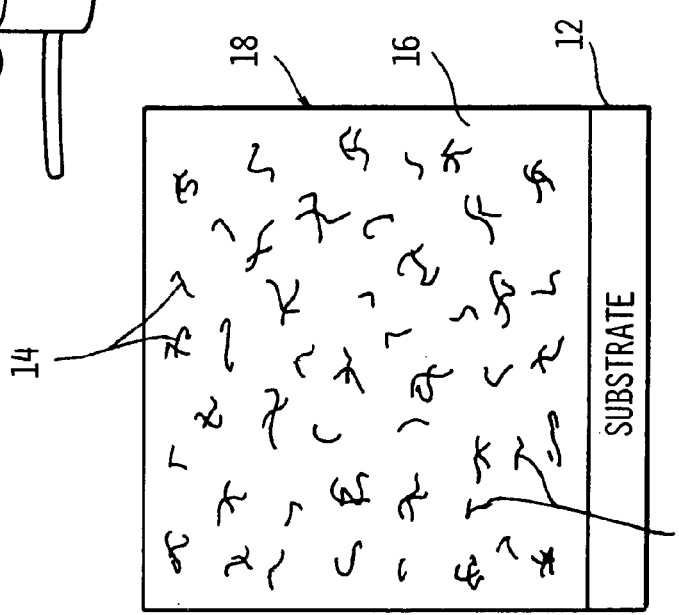
FIG. 3 is a schematic view of an embodiment of the nanowires and nanoparticles of an embodiment of the present invention.

FIG. 3 is a simplified schematic view of the nanowires 14 of the present invention connected to high surface area catalytic nano-particles 22 and/or electrolyte grains 24. It is to be understood that each of the nanoparticles 22 is a site at which catalysis may take place.

As previously stated, in an embodiment of the present invention, the nanowires 14 may be deposited in a random orientation. Nanowires 14 deposited in this manner, in conjunction with the connection to nano-particles 22 and electrolyte grains 24, provide further enhancements to catalytic performance of the film 20 by providing a greater number of catalytic sites per unit volume where catalysis may take place.

It is to be understood that it may be desirable in some instances to cause the nanowires 14 to be uniformly oriented throughout the film 20.

In an embodiment, the nanowires 14 each have a diameter D ranging between about 1 nm and about 100 nm. In an alternate embodiment, nanowires 14 have a diameter D between about 10 nm and about 50 nm.

In an embodiment of the present invention, the length of each of the nanowires 14 ranges from between about 15 nm and about 2000 nm. In an alternate embodiment, the length ranges between about 100 nm and about 500 nm. Without being bound to any theory, it is believed that the diameter D and length of each of the nanowires 14 further improve the catalytic activity of the film 20 by also increasing the number of catalytic sites per unit volume. Additionally, the small diameter D and length of the nanowires 14 advantageously result in smaller amounts of catalytic material used, while enhancing the catalytic activity of the film 20.

It is to be understood that the shapes of the nano-particles 22 and/or the electrolyte grains 24 may be of any suitable geometry. The shapes may all be the same geometry, a similar geometry, or a mix of geometries. FIG. 3 illustrates a schematic representation of various shapes. In an embodiment, the shapes of the nano-particle 22 and the electrolyte grains 24 are regular and/or non-regular geometries. Some non-limitative examples of these shapes include, but are not limited to particles, spheres, cylinders, cubes, and/or cones.

Figure 4:
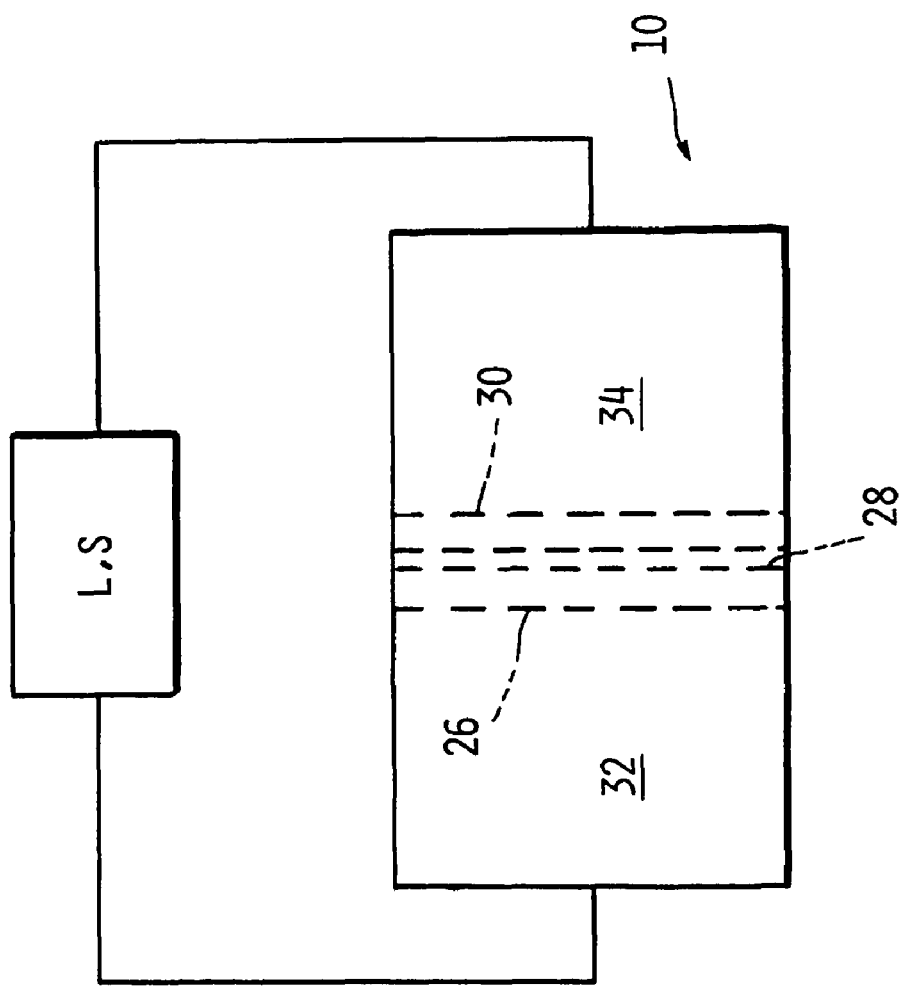
FIG. 4 is a schematic view of an embodiment of the fuel cell of the present invention.

Now referring to FIG. 4, an embodiment of a fuel cell 10 of the present invention includes an anode 26, an electrolyte 28, and a cathode 30. FIG. 4 is a simplified schematic diagram of a dual chamber fuel cell 10. It is to be understood that fuel cell 10 may also be a single chamber fuel cell.

It is to be understood that the fuel cell 10 may be one of solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells. In an embodiment of the present invention, fuel cell 10 is a solid oxide fuel cell.

In the fuel cell 10 embodiments of the present invention, oxidants 34 are carried to the cathode 30, and reactants 32 are carried to the anode 26. In an embodiment, the reactants 32 are fuels, and the oxidants 34 are one of oxygen, air, and mixtures thereof. It is to be understood that any suitable fuel/reactant 32 may be used with the fuel cell 10 of the present invention. In an embodiment, the fuel/reactant 32 is selected from at least one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant 32 is selected from the group consisting of butane, propane, methane, pentane, and mixtures thereof. Suitable fuels may be chosen for their suitability for internal direct reformation, suitable vapor pressure within the operating temperature range of interest, and like parameters.

It is to be understood that if fuel cell 10 is a single chamber fuel cell, a gaseous mixture of reactant 32 and oxidant 34 may be directed toward the anode 26 and/or the cathode 30.

An embodiment of a method of using fuel cell 10 includes the step of operatively connecting the fuel cell 10 to electrical load L and/or to electrical storage device S. The electrical load L may include many devices, including, but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 10 of the present invention may, in some instances, be suitable for use in the transportation industry, e.g. to power automobiles, and in the utilities industry, e.g. within power plants.

Embodiments of the present invention provide many advantages, examples of which include, but are not limited to the following. Embodiments of the present invention may advantageously result in improved thermal and mechanical stability of fuel cell (for example, SOFC) device management. Without being bound to any theory, it is believed that, generally, as a result of, among other factors mentioned herein, the disordered arrangement of the nanowires 14 within the film 20, embodiments of the fuel cell 10 of the present invention may advantageously result in an increase in the surface area and in the number of catalytic sites per unit volume where catalysis may take place. Another advantageous result is the higher ion/electron conductivity through the catalyst at the anode 26 and cathode 30. It is believed that the increased surface area and ionic and electronic conductivity resulting from the present invention may alleviate the problems of activation and ohmic overpotential that are associated with known SOFC device performance. Further, the modification of the electronic properties may significantly enhance the overall performance of the cathode 30 and anode 26 elements within an SOFC device. Still further, embodiments of the present invention may result in superior mechanical strength of the anode 26 and/or cathode 30 and limit damage to the anode 26 and/or cathode 30 due to repeated cycles of heating and cooling. Embodiments of the present invention may further advantageously result in a simple method of altering the composition of the anode 26 and the cathode 30. Further, embodiments of the present invention offer lower cost deposition processes. Still further, embodiments of the present invention offer patterning of the nanowires 14 and electrodes without the use of additional etching.

While several embodiments of the present invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A fuel cell, comprising:
   an electrolyte substrate; and
   a patterned film cathode established on the substrate, the patterned film including insoluble matter of an imaged photoresist having a plurality of nanowires dispersed therein, at least one of the plurality of nanowires contacting at least an other of the plurality of nanowires;
   wherein the plurality of nanowires enhances catalytic activity and conductivity of the patterned film.

2. The fuel cell as defined in claim 1 wherein the plurality of nanowires increases the number of sites per unit volume where catalysis takes place.

3. The fuel cell as defined in claim 1 wherein the electrolyte is at least one of oxygen ion conducting membranes, proton conductors, carbonate ($CO_3^{2-}$) conductors, $OH^-$ conductors, cubic fluorite structures, doped cubic fluorites, proton-exchange polymers, proton-exchange ceramics, yttria-stabilized zirconia, samarium doped-ceria, gadolinium doped-ceria, $La_aSr_bGa_cMg_dO_{3-\delta}$, and mixtures thereof.

4. The fuel cell as defined in claim 1 wherein the substrate is at least one of single crystal silicon, polycrystalline silicon, silicon oxide containing dielectric substrates, alumina, sapphire, ceramics, cermets, anode materials, cathode materials, current collector materials, and mixtures thereof.

5. The fuel cell as defined in claim 1 wherein the plurality of nanowires is formed from at least one of carbon, copper, nickel, platinum, gold, iron, alloys thereof, stainless steel, lanthanum strontium chromite, current collector materials, electrode materials, catalyst materials, electrolyte filament materials, and mixtures thereof.

6. The fuel cell as defined in claim 5 wherein the current collector material comprises high temperature metals.

7. The fuel cell as defined in claim 6 wherein the high temperature metals are at least one of gold, copper, stainless steel, nickel alloys, and mixtures thereof.

8. The fuel cell as defined in claim 1 wherein the patterned film comprises an anode.

9. The fuel cell as defined in claim 8 wherein the plurality of nanowires comprises metallic components of anode material.

10. The fuel cell as defined in claim 9 wherein the anode metallic components comprise at least one of nickel-copper alloys, platinum, palladium, ruthenium, alloys thereof, and mixtures thereof.

11. The fuel cell as defined in claim 1 wherein the plurality of nanowires comprises metallic components of cathode material.

12. The fuel cell as defined in claim 11 wherein the cathode metallic components comprise at least one of rhodium, platinum, silver, alloys thereof, and mixtures thereof.

13. The fuel cell as defined in claim 1 wherein the plurality of nanowires is randomly oriented throughout the patterned film.

14. The fuel cell as defined in claim 1 wherein each of the plurality of nanowires has a diameter ranging between about 1 nm and about 100 nm.

15. The fuel cell as defined in claim 1 wherein each of the plurality of nanowires has a diameter ranging between about 10 nm and about 50 nm.

16. The fuel cell as defined in claim 1 wherein each of the plurality of nanowires has a length ranging between about 15 nm and about 2000 nm.

17. The fuel cell as defined in claim 1 wherein each of the plurality of nanowires has a length ranging between about 100 nm and about 500 nm.

18. An electronic device, comprising:
    a load; and
    the fuel cell of claim 1 connected to the load.

19. A method of using a fuel cell, comprising the step of:
    operatively connecting the fuel cell to at least one of an electrical load and an electrical storage device, the fuel cell comprising:
    an electrolyte substrate; and
    a patterned film cathode established on the substrate, the patterned film including insoluble matter of an imaged photoresist having a plurality of nanowires dispersed therein, at least one of the plurality of nanowires contacting at least an other of the plurality of nanowires;
    wherein the plurality of nanowires enhances catalytic activity and conductivity of the patterned film.

20. A fuel cell, comprising:

an electrolyte substrate;

a patterned film cathode established on the substrate, the patterned film including insoluble matter of an imaged photoresist; and a plurality of means, dispersed throughout the patterned film, for substantially enhancing catalytic activity and conductivity throughout the patterned film, at least one of the plurality of means contacting at least an other of the plurality of means.

21. The fuel cell as defined in claim 1 wherein the fuel cell is a single chamber fuel cell.

22. The fuel cell as defined in claim 1 wherein the plurality of nanowires is connected to at least one of catalytic nanoparticles or electrolyte grains.

23. The fuel cell as defined in claim 1 wherein the plurality of nanowires is formed from electrolyte filament materials, and wherein the fuel cell further comprises cathode material nanoparticles dispersed on and connected to the electrolyte filament material nanowires.

24. The fuel cell as defined in claim 1 wherein the fuel cell is a solid oxide fuel cell.

25. The fuel cell as defined in claim 1 wherein the imaged photoresist is a negative photoresist or a positive photoresist.

* * * * *